Aug. 31, 1926.

M. DE CONINCK 1,598,268

ELECTRIC PROPULSION OF SHIPS AND OTHER VEHICLES

Filed June 8, 1920   5 Sheets-Sheet 1

INVENTOR
Marcel de Coninck
BY
Townsend & Decker
ATTORNEYS.

Aug. 31, 1926.

M. DE CONINCK

1,598,268

ELECTRIC PROPULSION OF SHIPS AND OTHER VEHICLES

Filed June 8, 1920    5 Sheets-Sheet 2

INVENTOR
Marcel de Coninck
BY Townsend + Decker
ATTORNEYS

Patented Aug. 31, 1926.

1,598,268

UNITED STATES PATENT OFFICE.

MARCEL DE CONINCK, OF LE HAVRE, FRANCE.

ELECTRIC PROPULSION OF SHIPS AND OTHER VEHICLES.

Application filed June 8, 1920, Serial No. 387,385, and in France July 15, 1919.

My invention relates to electric propulsion of ships and other vehicles and in particular to systems of propulsion in which the transmission of energy from the prime movers to the propellers is effected by means of polyphase alternating currents.

The object of the invention is to provide certain improvements in electric systems of propulsion, especially from the point of view of first cost, weight, reliability and efficiency of the equipment and allowing for an easy control of the speed of the ship or other vehicle.

The chief feature of my present invention is its ability for continuous variation of the frequency of the alternating current from zero up to the value corresponding to the maximum speed of the vehicle, without undue speed variations of the prime mover. In my system, the number of revolutions of the propeller may be thus easily varied without resorting to driving motors comprising a plurality of windings or intricate devices for the alteration of the pole number or concatenation of several motors.

The characteristics and various arrangements of my invention are illustrated by the accompanying drawings in which.

Figure 1:
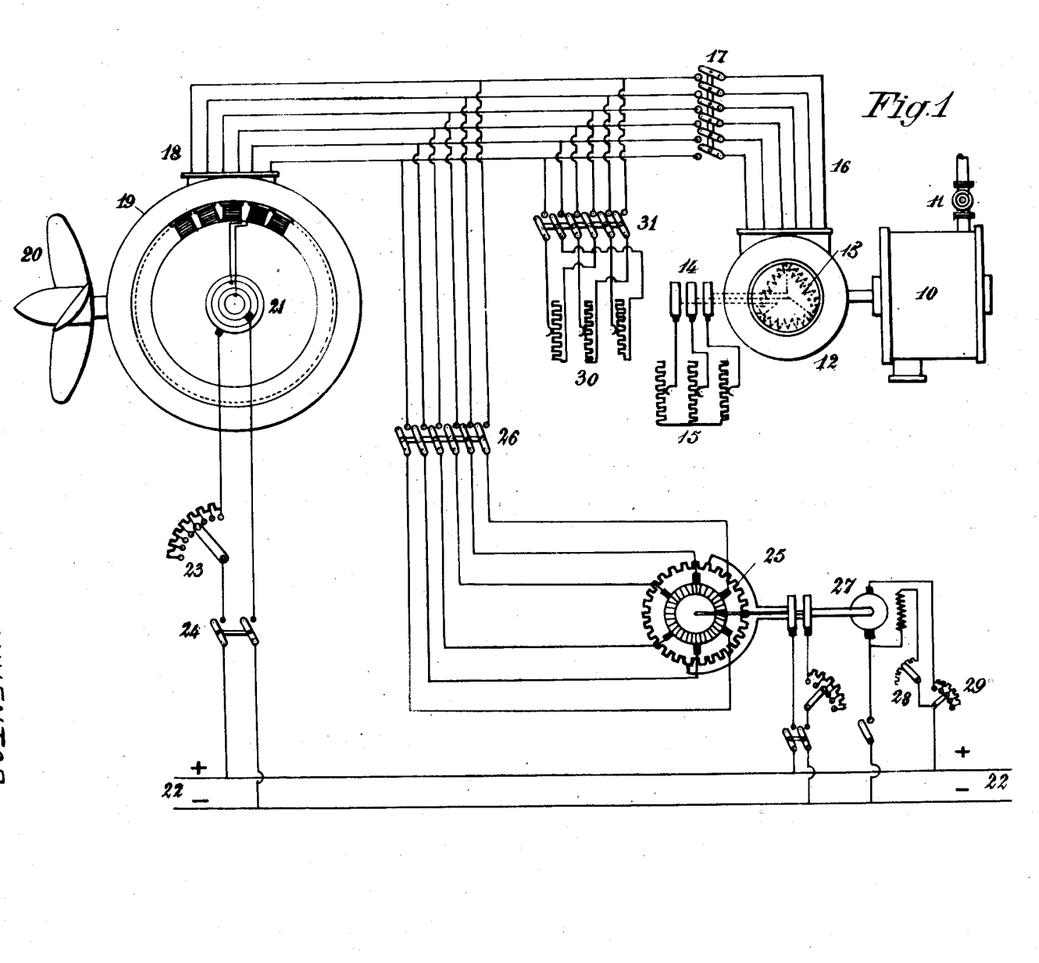
Fig. 1 diagrammatically illustrates the general features of my invention.

Referring first to Fig. 1 of the drawings, there is represented a thermal prime-mover 10, with means 11 for regulating the power, coupled to a polyphase asynchronous generator 12. The rotor of said generator carries the secondary circuit whose resistance may be varied by means diagrammatically represented in the form of a winding 13, slip rings 14 and a rheostat 15. The leads 16 of the primary winding of the generator are connected by a suitable switching device 17 to the leads 18 of a polyphase machine 19 which drives the propeller 20. This machine 19 works as a motor in respect to the active energy and as a generator in respect to the reactive energy, i. e. it receives the load current from the generator 12 and delivers in turn to said generator the total amount of wattless current necessary to its functioning.

The machine represented by 19 is of the salient pole type, comprising a large number of poles, of which a part only is shown in the figure. The poles carry excitation coils fed with direct current by means of the slip rings 21 connected to the mains 22 of a direct current supply through the field rheostat 23 and disconnecting switch 24. The driving machine 19 will be somewhat similar in construction to those known in land practice as "synchronous", but its frequency does not need adjustment to any external frequency setting supply and can be varied continuously within wide limits. This construction of driving machine 19 will even be more simple than that of a common synchronous motor, since it does not need any squirrel-cage or amortisseur winding, which are necessary in usual practice for starting and synchronizing.

25 represents the commutating rheostat for starting, reversing and low-speed navigation, whose brushes are connected to the leads of the propeller-driving machine by the switch 26. The speed of rotation of the commutating rheostat, and in consequence, the frequency of the alternating currents delivered by the brushes, is varied by regulating the speed of the small driving motor 27, fed with direct current. The speed regulation is obtained by means of the field rheostat 28 and the rheostat 29 in series with the armature.

There is represented at 30 the resistors by which a powerful braking effect can be exerted, not only on the driving motor alone, but also on the generator set when connected to the motor.

Figure 4:
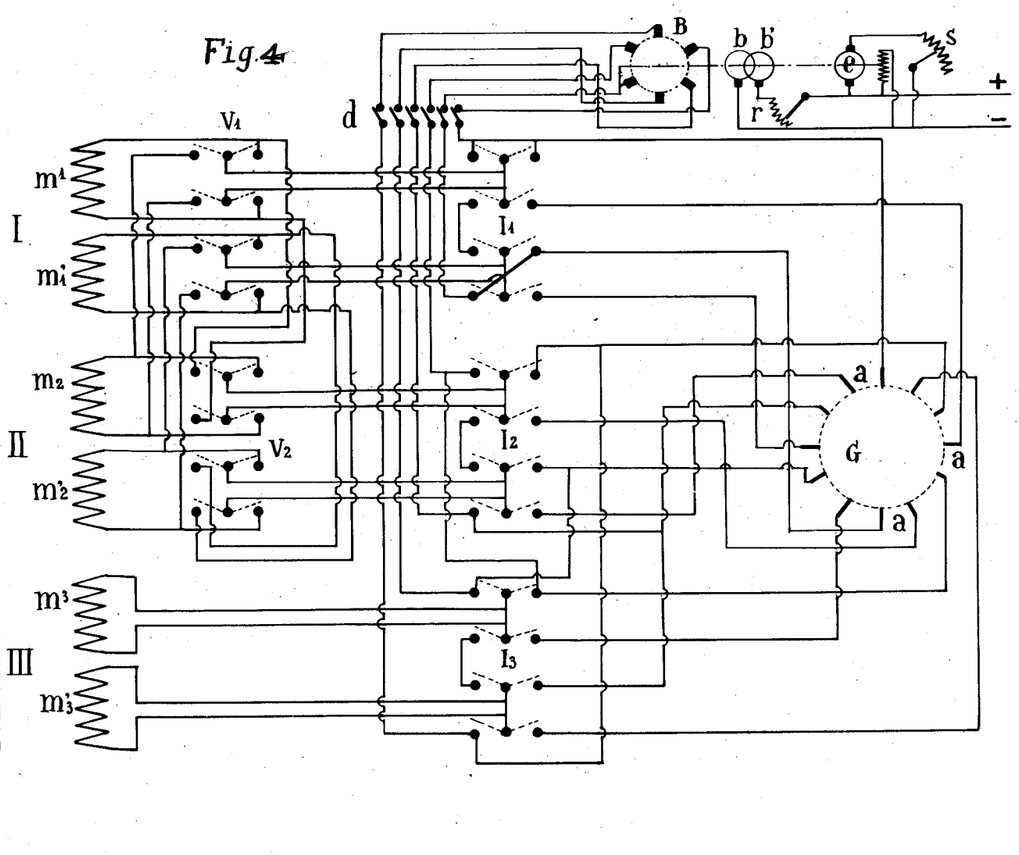
Fig. 4 diagrammatically represents the connections between the driving motor and a squirrelcage asynchronous generator allowing for two economical speeds.

In the drawings, Fig. 4 represents an arrangement by which two economical speeds can be obtained, as well as good maneuvering qualities, by using an asynchronous generator of the squirrel-cage type, allowing for pole-number alteration by changing the connections between the generator and the motor. If the generator allows for two different numbers of poles, there will be two different values of the mechanical frequency, in direct relation to the number of poles. The arrangement shown in Fig. 5 allows for four poles and two poles to be obtained at the generator, thus permitting reducing the mechanical frequency to one-half of the value corresponding to full-speed navigation, it being understood that the speed of the prime-mover remains constant. The alteration by decrease in number of poles of the pole number of the generator not only permits different economical speeds of the ship, but also has the advantage of automatically increasing the effective resistance of the secondary circuit for the lower pole number proportionate to propulsive speed. Thus a higher secondary resistance is obtained at low speeds, which is advantageous from the point of view of good torque in starting and effective variable secondary resistances are obtained to insure steady running of the motor at all speeds, without torque losses of material degree when the ship is running at full speed.

Figure 3:
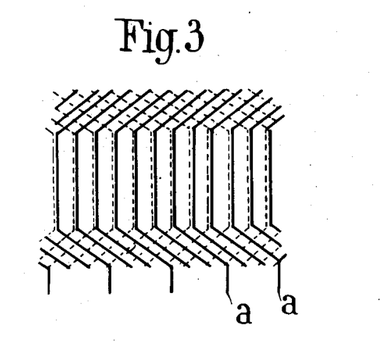
Fig. 3 diagrammatically represents the primary winding of the generator allowing for alteration of the pole number.

In Fig. 4, the stationary winding of the generator G is of the parallel two-layer type (see Fig. 3) comprising a plurality of equidistant taps $a$. The general arrangement represented in Fig. 4 permits obtaining a generator with four poles or two poles. The connections for four poles correspond to the full speed of the ship and the connections for two poles allow for an economical running at half speed and an easy speed regulation below half speed by mere control of the field current of the driving motor, i. e., by varying the voltage of the system. The generator G comprises twelve leads $a$. For the four-poles connection, there are three taps per pole and two diametral leads can be considered as connected in parallel. For the two-poles connection, every other tap remains unconnected.

The double-throw switches $I_1$ $I_2$ $I_3$ allow the proper connections to be made between the generator G and the electric motor. According to the number of poles considered, the pitch of the winding must be regarded as shortened or lengthened with respect to the pole-pitch determined by the method of connecting the generator winding to the different phases of the electric propelling motor.

The study of fractional pitch two-layer windings shows that the pole pitch may be substantially different from the pitch of the winding without undue change of function of the generator. Each of the phases I, II and III of the driving motor is divided into two circuits $m_1$ and $m_1'$, $m_2$ and $m_2'$, $m_3$ and $m_3'$, which are connected in parallel at the higher speeds and in series at the lower speeds, by means of the switches $I_1$ $I_2$ $I_3$. The reversing switch $V_1$ $V_2$ allows two phases to be interchanged for reversed motion. The commutating rheostat represented in R is driven by a small direct-current motor $e$ whose speed is controlled by means of a rheostat $s$ in series with the armature.

In my system, the starting of the driving motor is effected by feeding it with alternating currents whose frequency may be continuously varied from zero up to a certain value, by means of a special device which I call "commutating rheostat," whose object is to convert into polyphase alternating currents with variable frequency the continuous current supplied by a source usually present in ships for lighting and auxiliaries.

Figure 2:
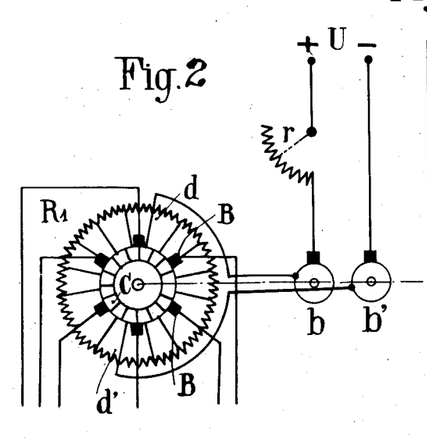
Fig. 2 diagrammatically represents the commutating rheostat used for starting.

The commutating rheostat consists, as shown in Fig. 2, of a closed resistance winding R divided into certain number of sections, each connected to a bar of a commutator C. Two diametral points $d$ $d'$ of the winding are connected to the mains of the direct current supply through a rheostat $r$ which allows the voltage at the rings $b$ $b$ to be varied. The commutator includes six equidistant lines of brushes B connected to the terminals of the driving motor, designed to be three-phase with open phases. If the rheostat be rotated, it will be seen that the points $d$ $d'$ between which a continuous difference of potential exists, will successively come in contact with the leads of each phase of the motor, in an alternating manner. Each phase will thus be submitted to an alternating electromotive force whose wave form, it is true, may be somewhat different from a sine wave. The windings of the motor will carry, however, polyphase alternating currents whose fundamental frequency will correspond to the speed of rotation of the commutating rheostat. If this speed be varied from zero up to a given value, the motor will start and follow the variation of speed. A certain critical speed may thus be attained below which the active energy supplied to the motor by the generator alone is not sufficient to pull it into step. The value of this critical speed depends on the relative resistances of the primary and secondary windings. It may be fairly low, for instance 10% of the normal speed, if the resistance of the secondary circuit of the generator is sufficient. The power brought into action by the commutating rheostat may thus be very small and will not exceed in general a few percent of the full load power, for a length of time of only a few seconds. It is evident that, in such case, the questions of efficiency of the commutating rheostat, wave form, harmonics, etc., are but of slight importance.

Figure 5:
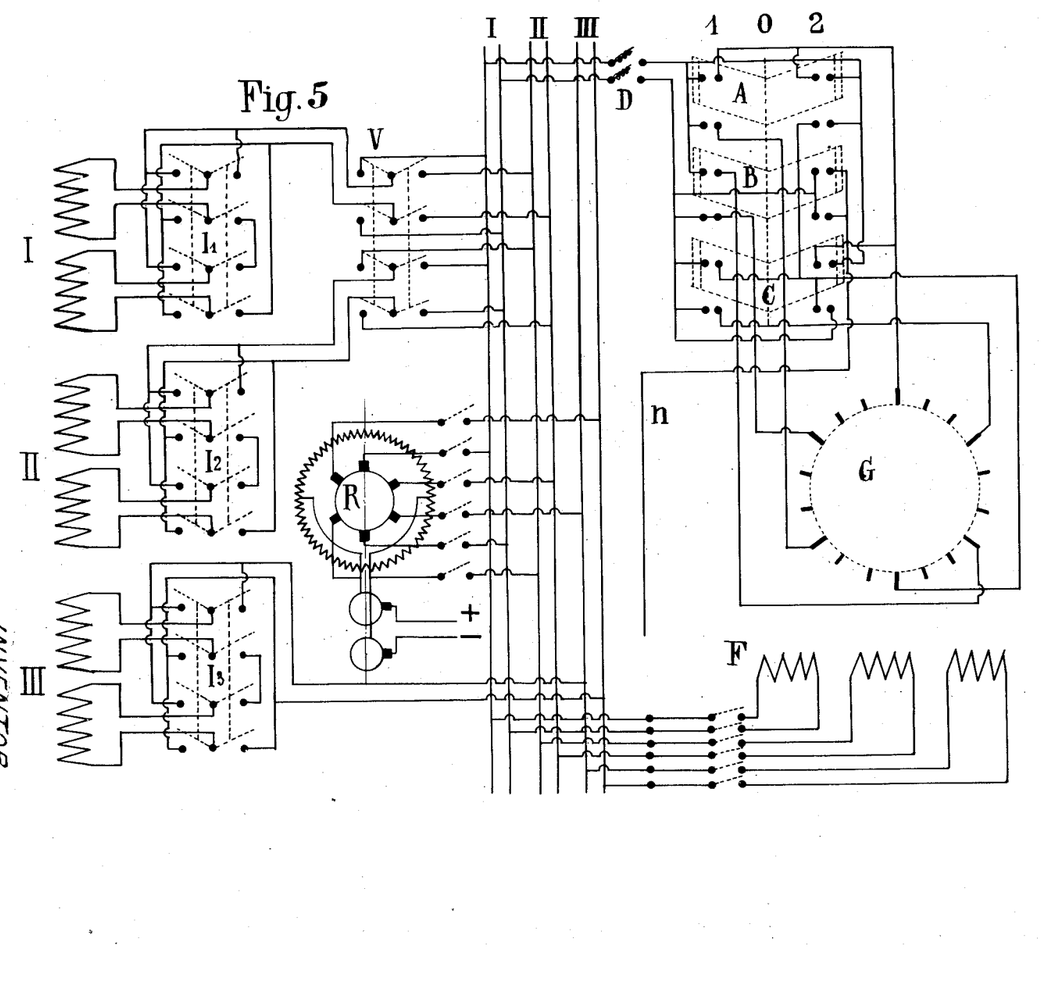
Fig. 5 diagrammatically represents the connections between the driving motor and a squirrelcage asynchronous generator allowing for three economical speeds.

Fig. 5 shows the arrangement for a generator having 6, 4 or 2 poles, allowing for three economical speeds: full speed, two-thirds and one-third. This arrangement would be especially convenient for warships, since it allows for cruising speed about two-thirds of the maximum speed.

Figure 6:
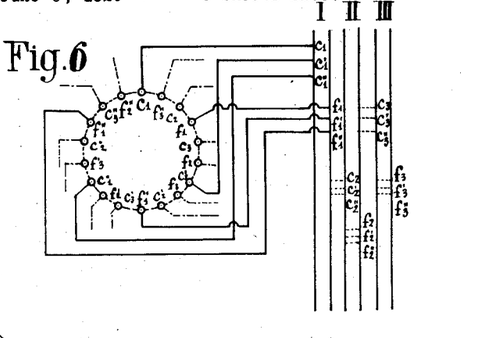
Figs. 6, 7 and 8 are simplified diagrams of the connections shown in Fig. 5.
Figure 7:
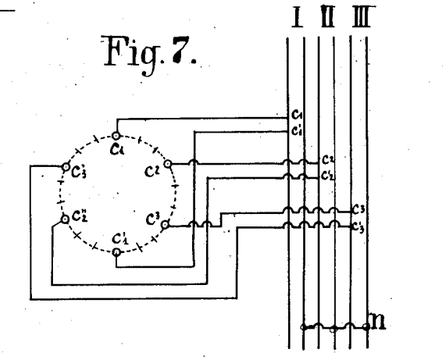
Figure 8:
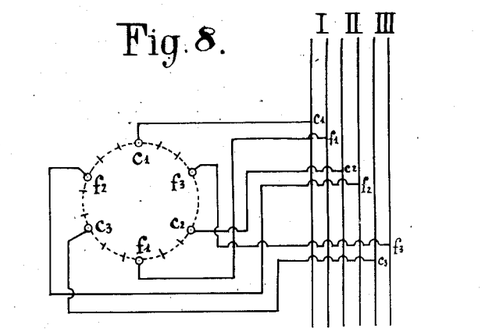

The primary winding of the generator comprises eighteen taps. The connection between the generator and the bus-bars I II III are shown in a simplified manner by Figs. 6, 7, and 8. At full speed, the generator is connected six-phase—six poles: at two-thirds speed, the generator is three phase—4-poles; the neutral wire being shown at $n$; at one-third speed, the generator is six-phase 2 poles.

Changing the pole number is operated by means of double-throw switches or contactors such as shown in A B C for one phase only, for the sake of clearness of the drawing.

In reality there will be three switches such as A operated simultaneously, and similarly for B and C. Six-poles connection is obtained with the contacts $A_1$ $B_1$ $C_1$ closed, four poles with $A_2$ $B_2$ $C_0$, and two poles with $A_0$ $B_0$ $C_2$. Each of the two phases of the driving motor is divided into two circuits which may be connected in parallel for full-speed and two-thirds speed, or in series for one-third speed by means of the double-throw switches $I_1$ $I_2$ $I_3$. Reversing is obtained by interchanging two phases by the double-throw switch V. The switches D allow the motor to be separated from the generator. They may be arranged for instance in such a manner as to allow current to be cut off at full load; the switches $I_1$ $I_2$ $I_3$ and A, B, C, may then be operated idle.

The commutating rheostat is shown at R. F represents the braking resistances with switches for cutting the same in and out of circuit.

The connections are the same for a generator having 12, 8 and 4 poles, or 18, 12 and 6 poles, or 24, 16 and 8 poles, etc.; the winding of the stator will then comprise 2, 3, 4, etc., circuits connected in parallel.

In the case of Fig. 5, the generator G comprises 18 equidistant leads.

Certain particulars and advantages of the arrangement are hereinafter described:

When the prime-mover is a high speed steam turbine, the asynchronous generator with squirrel-cage rotor will be of very simple construction. The rings of the squirrel-cage can be much stronger than the field-coil ends of an ordinary synchronous alternator. The rings and bars of the squirrel-cage can be advantageously arranged so as to give a substantial Kelvin effect (skin effect) when the slip is high, that is, for low speeds of the propeller.

The propeller driving motor will be preferably of the salient pole type with direct current excitation, although theoretical characteristics of my system may be obtained as well with an induction motor having its secondary circuit fed with low-frequency currents by means of an alternating current commutator machine.

The salient pole type motor is advantageous from the point of view of weight and mechanical strength. It allows for large air gaps and slow peripheral velocity without the power factor limitations which are inherent in induction motors. Furthermore, it permits an easy electrical braking by mere connection to resistances.

In my system the generator converting the mechanical energy of the prime mover into electrical energy is of the asynchronous type, i. e. the frequency of the alternating current may be widely different from that which may be called the "mechanical frequency" of the generator, determined by its pole number and speed of rotation.

If N be the pole number of revolutions per minute of the generator, $2p$ its pole number, the value F of this "mechanical frequency" is:

$$F = p\frac{N}{60}$$

If $n$ be the number of revolutions per minute of the propeller driving motor, designed to be of the salient pole type with 2P poles, the frequency set up by the rotation of the motor will be:

$$F' = P\frac{n}{60}$$

If the primary windings of the motor and generator (supposed to be polyphase) are connected together and excitation put on the poles of the motor, the electromotive force produced by the motor, at F' frequency, is impressed on the primary winding of the generator and thus gives rise to a revolving field whose speed of rotation is:

$$N' = \frac{60}{p}F'$$

Therefore a certain slip N—N' exists between the revolving field and the rotor of the generator. Currents are thus generated in the rotor circuit, which induce in turn currents in the primary winding. The component of the primary current which is in phase with the electromotive force impressed corresponds to the load or active energy of the generator. The component which is in quadrature corresponds to the magnetic or reactive energy which is necessary to the functioning of asynchronous generators. In my system this reactive energy is supplied entirely by the propeller driving machine which is provided with suitable excitation.

In my system, the frequency F' of the currents flowing in the circuits may be varied continuously within wide limits by alteration of the slip percentage F—F'/F between the mechanical frequency F of the generator and the frequency F' of the propeller driving machine. For a given speed of the generator, the actual value F' of the frequency depends on the slip, which depends in turn on the excitation of the propeller driving machine, the resistance of the secondary circuit of the generator and the motive torque of the prime mover. The number of revolutions of the propeller, which is proportional to the frequency F', may thus be varied by alteration of the secondary resistance of the generator and regulation of the excitation of the driving motor.

The theoretical considerations involved in my system may be easily viewed in the light of a combination of the well-known diagrams for induction motors and alternators, with the difference that, in this case, the direction of the active component of the current should be reversed. These diagrams show the relation between the torque of the motor, its excitation and the slip. The power-factor of the system is that of the generator and reaches very high values when the pole pitch of the generator is fairly large; as in turbine-driven generators. For a given value of the excitation, a certain maximum or stalling torque exists beyond which it may be said that the driving motor falls "out of step." The word "step" should not be understood here with the same strict sense as in synchronous machines. By "in step" and "out of step" I simply mean that the figurative point of action in the diagram is on this side or on that of the stalling point. For high values of the secondary resistance of the generator, there may even be no stalling point, i. e., the slip may reach nearly 100% without unsteady running. In such case, the number of revolutions of the propeller may be easily controlled down to very low values by mere regulation of the field of the driving motor, without altering the speed of the prime mover. This will be a great advantage for maneuvering the ship at low speeds, in which case the matter of low efficiency inherent to high slips is but of little importance, since the power brought into action is only a small percentage of the full-load power and is used only for short lengths of time. Thus the losses measured in weight of fuel are negligible in respect of the maneuvering ability obtained.

If a quick stopping is needed with the ship steaming at its normal speed, the steam or fuel admission is cut off and the terminals of the motor are connected to resistors 30 by switch 31. The speed of both the motor and generator set will decrease until the propeller, driven by the movement of the ship gives a torque equal to the resistant torque of the motor 19 working as an alternator connected to resistors. Braking may thus be applied very suddenly without the loss of time which is always required to reverse the usual engines during which time the ship travels a very considerable distance before the retardating thrust can be felt.

When the propeller, as well as the generating set connected by it, has sufficiently slowed down, the generating set is disconnected and the motor is nearly stopped by shortcircuiting the resistors 30. The reversing of the propeller motion will then be operated by the commutating rheostat fed with direct current, which carries the driving motor up to a speed somewhat in excess of the critical speed, in the same way as for starting in "ahead" motion, except that the connections to the motor should be suitably crossed to correspond with the reversed motion, by means of switching devices not represented in Fig. 1. The motor is then connected to the generator which pulls it into step, the commutating rheostat being disconnected as soon as the power received by the motor from the generator is sufficient to give the motor a proper acceleration.

Another advantage of my system concerns the rapidity of switching operations. With ordinary turbo-alternators, the time constant of the field circuit is very high, i. e. the time necessary for the extinction of the magnetic flux amounts to several seconds. In my system, the time constant is approximately that of the field circuit of the driving motor, which is much shorter on account of its small pole pitch as compared with the pole pitch of a turbo-alternator. Thus, if the field current of the motor is cut off, the voltage dies off rapidly and the switches for pole changing, reversing, etc. can be operated idle.

In the case of a squirrel-cage generator with pole-number alteration, the operation for speeding up the ship is as follows:

For starting, the generator set may be preferably of reduced speed (for instance half speed) and then raised to its normal speed after the driving motor has come into step. When the ship has reached a uniform speed corresponding to the lower pole number of the generator, the steam or fuel admission is cut off. Both the generator set and the motor will thus slow down to a degree corresponding approximately to the slip of the propeller (say 15%) until the propeller turns idle, driven by the speed of the ship. The motor will then be connected with the upper pole number of the generator. When passing, for instance, from two-pole to four-pole connection, the slip in the generator will be about 50%. By momentary over-excitation of the motor, a sufficient electric torque is produced, which tends to accelerate the propeller and decrease the speed of the generator set. The slip in the generator will therefore diminish and the torque rapidly increases until the motor comes into step. The generator set is then brought to its normal speed by increasing the steam or fuel admission.

For reversing the motion of the ship, the operation would be the same as hereinbefore described, when once the propeller has been brought nearly to a standstill by connection to the braking rheostat. In this case, however, it may be necessary to slow down the generator set to a lower speed and to give a higher momentary over-excitation to the motor, in order to obtain a reversing torque higher than the motive torque impressed on the propeller by the motion of the ship.

Figure 9:
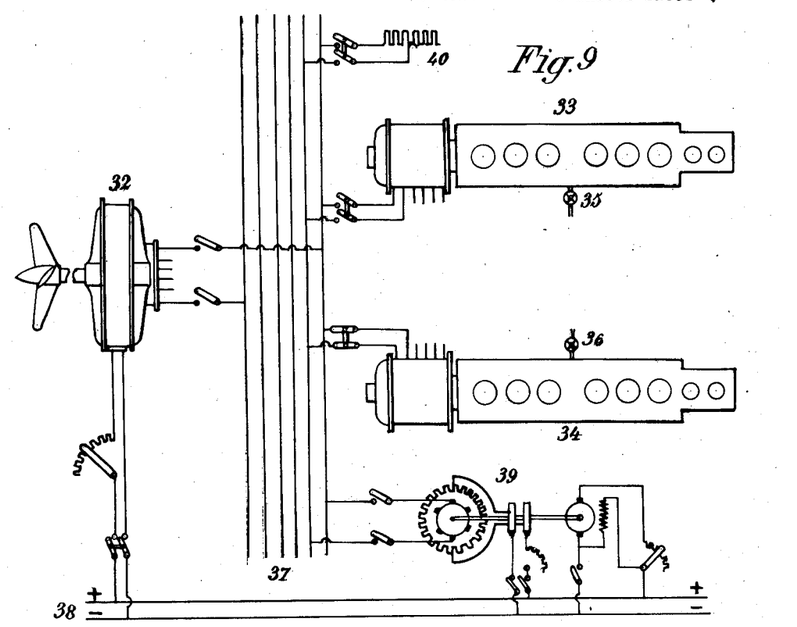
Fig. 9 diagrammatically illustrates an application of my invention to a ship in which the prime mover consists of a plurality of internal combustion engines coupled to asynchronous generators working in parallel.

In the drawings, Fig. 9 illustrates an application of my invention to a ship whose prime movers consist of internal combustion engines. In this case, a single propeller driving motor 32 may be fed with current from a plurality of generator sets 33, 34 . . . working in parallel.

With asynchronous generators, the paralleling operations will be very easy, without need of phase lamps or synchronoscopes, as it is the case with synchronous generators.

In my system, paralleling operation only needs an approximate adjustment of the speed of the generators by means of suitable devices for fuel supply regulation 35, 36. It will be possible thus to supply energy to a single high-power propeller from several internal combustion engines of moderate power, now in the field of common practice.

A great advantage is further obtained from the point of view of dependability by the fact that any particular engine may be stopped for inspection or repairs without stopping the ship, which may be driven at a somewhat lower speed by the remaining engines.

The principle of my system is the same as hereinbefore described in the case of turbo-electric drive, but the generators will be relatively low speed machines and their power-factor may not be so high as in turbine-driven asynchronous generators. Yet the power-factor will not fall down to the poor values encountered in systems where the propellers are driven by induction motors.

My system applied to Diesel-electric drive will permit an easy maneuvering of the ship without slowing down the engine to an undesirable degree.

The propeller speed may be accurately controlled by electric means such as: variation of the secondary resistance of the generators, regulation of the field of the driving motor, pole changing at the generators. These various means, combined with speed variation of the engines down to, say, 50% of their normal speed, allow for a continuous speed regulation between zero and full speed.

If the direct current supply consists in an auxiliary generating set, whose mains are shown at 38, the ship may be drivn at low speed by means of the starting device 39, with the main generator sets at rest. This will be an advantage in the case of breakdown of the main generators or low speed maneuvering of the ship in port.

Figure 10:
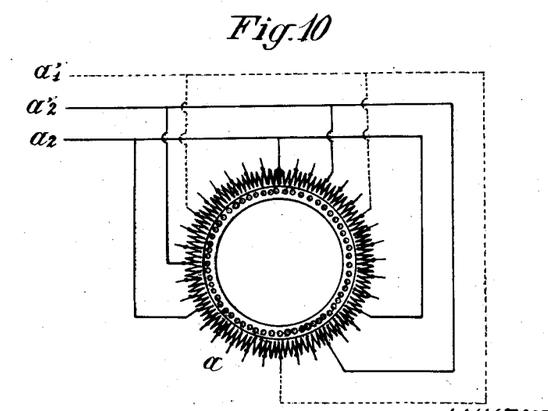
Fig. 10 diagrammatically represents the primary winding and internal connections of a low speed asynchronous generator arranged for pole number alteration.

In Fig. 9, the connections and switching devices between the bus-bars 37 and the generators 33, 34, the driving motor 32, the starting apparatus 39 and the braking resistances 40, are represented in a simplified manner, two conductors only being shown, for the sake of clearness of the drawing:

Fig. 10 represented diagrammatically the primary winding and internal connections of a squirrel-cage asynchronous generator, allowing for 12 poles or 6 poles. The generator has twelve terminals as in the case of a 4 pole/2 pole generator, but the winding comprising 36 taps $a\,a\,a$ . . . instead of 12, is divided in three identical parts, each of them corresponding to a 4 pole/2 pole circuit. Three of the taps 120° apart are connected in parallel by one of the twelve terminals. Such terminals as $a_2$ and $a_2'$ represent the ends of one phase for the 12 pole or full-speed connection. Terminals such as $a_2, a_1'$ represent the ends of one phase for the 6 pole or half speed connection.

The same principle of winding is evidently applicable to other values of the pole number, for instance 16/8 poles, with 12 terminals and 48 taps connected four by four in parallel, or 12/8/4 poles with 18 terminals and 36 taps connected two by two in parallel.

Claims:

1. A system for electric propulsion comprising a propeller driving machine consisting of a polyphase alternating current machine possessing a direct current field winding, and a synchronous generator receiving the whole of its magnetizing energy from the propeller-driving machine, a thermal prime mover driving said generator, and means for altering the effective secondary resistance of the generator and regulating the field current of the propeller driving machine to obtain a continuous variation of the frequency of the currents supplied by the generator.

2. A system for electric propulsion comprising a single propeller driving alternating current motor, possessing an unvariable number of poles excited with direct current, an induction generator receiving the whole of its magnetizing energy from said propeller driving motor, a thermal prime mover driving said generator and means for varying within a wide range the frequency of the current feeding the propeller driving motor independently of the speed of the generator, said means comprising switches for changing the number of poles of the generator by altering the connections between the generator and the driving motor to obtain several economical speeds for the propeller.

3. A system for electric propulsion comprising a propeller driven by a polyphase alternating current machine possessing a direct-current field winding, means for feeding said machine at a continuously variable frequency, an asynchronous generator receiving the whole of its magnetizing energy from the propeller-driving machine, a thermal prime-mover driving said generator and means for electrically braking the propeller and the generator set.

4. A system for electric propulsion comprising a propeller, a propeller driving alternating current motor possessing a direct current field winding, means for feeding said motor at a variable frequency, an induction generator receiving the whole of its magnetizing energy from the propeller driving motor, a thermal prime mover driving said generator, and means for starting the propeller driving motor from a continuous current supply acting through said field winding.

In testimony whereof I have signed this specification.

MARCEL DE CONINCK.